United States Patent
Longtin (10) Patent No.: US 9,533,707 B1
(45) Date of Patent: Jan. 3, 2017

(54) STEERING SYSTEM AND METHODS FOR DETERMINING GEAR DIMENSIONS

(71) Applicant: Thomas Longtin, Bennington, VT (US)

(72) Inventor: Thomas Longtin, Bennington, VT (US)

( * ) Notice: Subject to any disclaimer, the term of this patent is extended or adjusted under 35 U.S.C. 154(b) by 0 days.

(21) Appl. No.: 14/630,796

(22) Filed: Feb. 25, 2015

(51) Int. Cl.
*B62D 7/09* (2006.01)
*B62D 3/02* (2006.01)
*F16H 35/00* (2006.01)

(52) U.S. Cl.
CPC . *B62D 7/09* (2013.01); *B62D 3/02* (2013.01); *F16H 2035/003* (2013.01)

(58) Field of Classification Search
CPC ....... F16H 2035/003; B62D 7/09; B62D 7/14; B62D 7/142; B62D 7/15; B62D 3/02; B62D 7/1509; B62D 7/1518; B62D 7/026
USPC ........................................ 280/93.506, 93.513
See application file for complete search history.

(56) References Cited

U.S. PATENT DOCUMENTS

| 690,802 | A | 1/1902 | White |
| 4,387,642 | A | 6/1983 | Bringhurst et al. |
| 4,617,839 | A | 10/1986 | Matoba |
| 5,098,358 | A | 3/1992 | Igaku |
| 5,545,871 | A * | 8/1996 | Carr ........................ F16H 35/02 219/69.17 |
| 6,644,947 | B2 | 11/2003 | Cavanaugh |
| 7,237,629 | B1 | 7/2007 | Bland et al. |
| 7,686,107 | B1 | 3/2010 | Bland et al. |
| 2004/0064947 | A1* | 4/2004 | Yanagimoto ............ B23F 15/02 29/893.3 |
| 2011/0272332 | A1 | 11/2011 | Chang |

FOREIGN PATENT DOCUMENTS

| GB | 521249 A * | 5/1940 | ............. F16H 35/02 |
| GB | 560112 A * | 3/1944 | ............. B62D 7/026 |
| GB | 573505 A * | 11/1945 | ........... B60K 17/358 |

OTHER PUBLICATIONS

Chironis, N., Mechanisms, Linkages and Mechanical Controls. TX: Mcgraw-Hill, Jun. 1, 1965; pp. 238-245.
Longtin, Tom, Gonzo Gear Design, article, Apr. 2014, Power Transmission Engineering, p. 64. Apr. 1, 2014.

* cited by examiner

*Primary Examiner* — Ruth Ilan
(74) *Attorney, Agent, or Firm* — Middleton Reutlinger; Robert H. Eichenberger; Brantley C. Shumaker (57) ABSTRACT

Systems, methods, and apparatus are described herein related to steering assemblies to maintain a predetermined Ackerman geometry as well as for determining dimensions of modified elliptical gears based on ratios between angles of steerage implemented at first and second steerable wheels of a vehicle to maintain a predetermined Ackerman geometry.

10 Claims, 11 Drawing Sheets

STEERING SYSTEM AND METHODS FOR DETERMINING GEAR DIMENSIONS

BACKGROUND

When a vehicle turns, the wheels (or tires) on the inside and outside of the turn may trace out circles of different radii. Otherwise, one or both tires may skid and/or slip sideways, which may make the vehicle more difficult to control and/or may cause excessive wear and tear on the tire surfaces, not to mention scuffing of the surface on which the tires are traveling. In various steering systems, so-called "Ackerman geometry" may be imposed to ensure that the wheels on the inside and outside of a turn trace out different circles in a manner that avoids skidding and excessive wear and tear. As commonly understood with regard to wheels for moving objects, and as used herein, a wheel generally rotates about an "axle", and that wheel's axle is collinear with that wheel's axis of rotation. A "steering axis" is an axis of rotation about which a steering input is made to a steerable wheel in order to turn the wheel in a different direction, and that wheel's steering axis is perpendicular to that wheel's axis of rotation. As a vehicle is steered by turning the steerable wheel(s), the vehicle traverses a circle ("turning circle"), and the turning circle has center. Where a vehicle has only one steerable wheel, the turning circle has a radius defined as the distance from the center of the turning circle to the steering axis of the wheel. Where a vehicle has more than one steerable wheel, each steerable wheel may define its own radius about the center of the turning circle. In order to maintain Ackerman geometry in a vehicle with one or more steerable wheels (often front wheels) and two or more non-steered wheels (often rear wheels), lines extending from the axles of the steerable wheels must intersect a line extending from an axle shared by the non-steered wheels at a common point, which may be referred to as the center of the steering circle. Thus, a turn may require that the inside wheel be rotated more than the outside wheel.

SUMMARY

The present disclosure is generally directed to steering systems that maintain a predetermined Ackerman geometry using one or more gears having modified elliptical shapes. The present disclosure is also directed to determining dimensions of modified elliptical gears based on relative positions of wheels of a vehicle, as well as on relative angles of rotation required by steerable wheels to maintain a predetermined Ackerman geometry.

In some embodiments, a steering system may be provided that includes: a first wheel that is rotatable about a first steering axis perpendicular to an axis of rotation of the first wheel; a second wheel that is rotatable about a second steering axis perpendicular to an axis of rotation of the second wheel; at least indirectly connected first and second gears that are operable to rotate the first wheel about the first steering axis, the first and second gears having modified elliptical shapes; a sprocket operable to turn the second wheel about the second steering axis; and one or more linking members, such as, for example, chains or belts operably connecting the first gear to the sprocket. In various embodiments, the chain may be crossed over itself in between the first gear and the sprocket to form a figure eight. In various embodiments, the first and second gears may have second order elliptical shapes.

In various embodiments, a ratio of a minimum radius to a maximum radius of at least one of the first and second gears is substantially equal to a ratio of an incremental angle of rotation of the first wheel about the first steering axis to an angle of rotation of the second wheel about the second steering axis that is applied based on the incremental angle of rotation of the first wheel to maintain a predetermined Ackerman geometry. In various embodiments, the angle of rotation of the second wheel about the second steering axis comprises a maximum of a plurality of angles of rotation of the second wheel about the second steering axis that is applied based on a plurality of corresponding incremental angles of rotation of the first wheel about the first steering axis to maintain the predetermined Ackerman geometry.

In various embodiments, a minimum radius to maximum radius ratio of at least one of the first and second gears is substantially equal to a ratio of an angle of rotation of the first wheel about the first steering axis to an angle of rotation of the second wheel about the second steering axis that is applied based on the angle of rotation of the first wheel to maintain a predetermined Ackerman geometry.

In various embodiments, the first and second gears are directly connected. In various embodiments, the first and second gears are indirectly connected via one or more belts. In various embodiments, the steering system may further include at least one non-steered third wheel. One of the first and second wheels is farther from the non-steered third wheel than the other of the first and second wheels. In various embodiments, the steering system may further include a non-steered fourth wheel that shares an axis of rotation with the non-steered third wheel. One of the first and second wheels may be farther from the shared axis of rotation than the other of the first and second wheels.

In various embodiments, the first and second gears may have the same shape. In various embodiments, the first and second gears may be 90 degrees rotationally out of phase with one another.

In some implementations, a method may be provided that includes the steps of: determining a point of intersection between an axis of rotation of a first of the two steerable wheels and a shared axis of rotation of the two non-steered wheels when the first of the steerable wheels is rotated by a first angle of rotation about a first steering axis; determining a second angle of rotation about a second steering axis necessary to cause an axis of rotation of a second of the two steerable wheels to intersect the shared axis of rotation at the point of intersection; and selecting dimensions of the two gears based on a relationship between the first and second angles of rotation.

In various embodiments, the selecting may include selecting dimensions of the two gears based on a ratio between the first and second angles of rotation. In various embodiments, the method may further include: calculating a length of equal sides of an isosceles triangle having vertices at steering axes of the two steerable wheels and on the shared axis; calculating two interior angles of a first scalene triangle that shares one of the equal sides of the isosceles triangle and has vertices at the steering axes of the two steerable wheels and at the point of intersection; calculating two interior angles of a second scalene triangle with vertices at the steering axes of the two steerable wheels and at a first point slightly offset from the point of intersection along the shared axis of rotation in a first direction; calculating two interior angles of a third scalene triangle with vertices at the steering axes of the two steerable wheels and at a second point slightly offset from the point of intersection along the shared axis of rotation in a second direction that is opposite to the first direction; and selecting dimensions of the two gears based on a ratio of differences between the two interior angles of the second and third scalene triangles.

In various embodiments, the method may further include: calculating a length of equal sides of an isosceles triangle having vertices at steering axes of the two steerable wheels and on the shared axis; and calculating a line that bisects one of the equal sides of the isosceles triangle and an axis of rotation shared by the two steerable wheels. In various embodiments, the method may further include: determining the first angle of rotation based on a distance between the point of intersection and a first of the two non-steered wheels; and determining the second angle of rotation based on a distance between the point of intersection and a second of the two non-steered wheels.

In various embodiments, determining the point of intersection may include determining a plurality of points of intersection between an axis of rotation of the first of the two steerable wheels and a shared axis of rotation of the two non-steered wheels when the first of the steerable wheels is rotated by a plurality of incremental angles of rotation about the first steering axis. In various embodiments, determining the second angle of rotation may include determining a plurality of second angles of rotation about the second steering axis necessary to cause the axis of rotation of the second of the two steerable wheels to intersect the shared axis of rotation at the plurality of points of intersection. In various embodiments, selecting may include selecting dimensions of the two gears based on a relationship between one of the plurality of incremental angles of rotation about the first steering axis and one of the plurality of second angles of rotation about the second steering axis.

In various embodiments, the relationship may include a ratio between one of the plurality of incremental angles of rotation about the first steering axis and one of the plurality of second angles of rotation about the second steering axis. In various embodiments, the ratio may include a maximum of a plurality of ratios between the plurality of second angles of rotation about the second steering axis and the plurality of incremental angles of rotation about the first steering axis. In various embodiments, a sum of the plurality of incremental angles of rotation about the first steering axis is 180 degrees.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The present disclosure is generally directed to steering systems that maintain a predetermined Ackerman geometry using one or more gears having modified elliptical shapes. The present disclosure is also directed to determining dimensions of modified elliptical gears based on relative positions of wheels of a vehicle, as well as on relative angles of rotation required by steerable wheels to maintain a predetermined Ackerman geometry.

Figure 1:
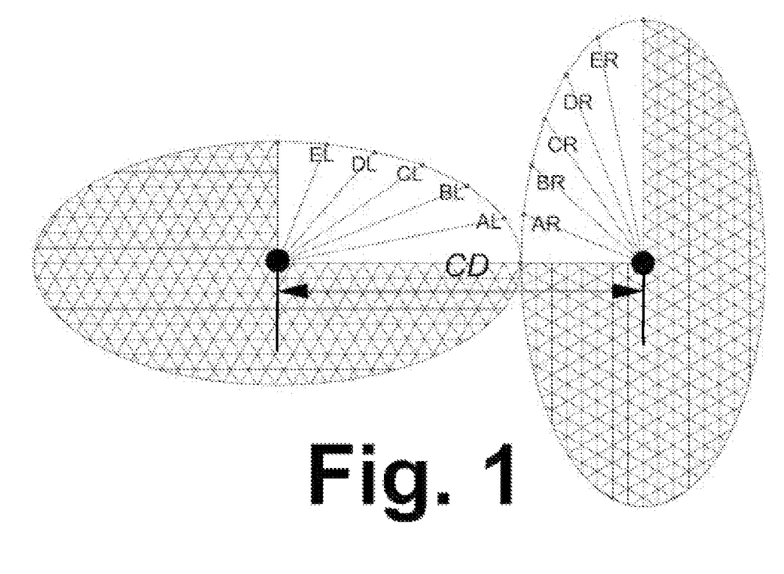
FIGS. 1-2 are graphs depicting an example of how gears with perfect elliptical shapes fail to maintain contact when rotated relative to one another.
Figure 2:
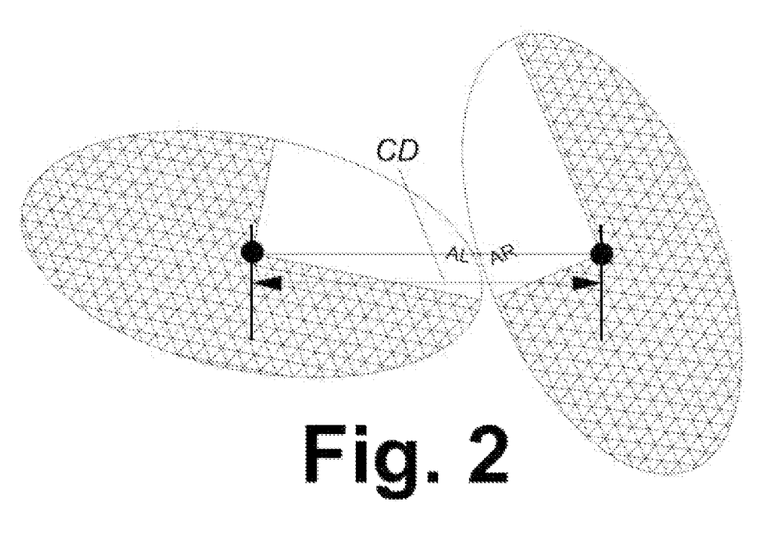

FIGS. 1-2 depict an example of how enmeshed gears with elliptical shapes fail to maintain contact when rotated relative to one another. Merriam-Webster online (http://www-.merriam-webster.com/dictionary/ellipse, last visited Jan. 27, 2015) defines an "ellipse" as "a closed plane curve generated by a point moving in such a way that the sums of its distances from two fixed points [e.g., the foci] is a constant." According to the Collins Dictionary of Mathematics, Second Edition, Borowski & Borwein, HarperCollins 2002, an ellipse is a conic section "formed by the intersection of a bounded nappe of a right circular cone with a plane that does not cut its base; that is, it is the projection of a circle onto another non-parallel plane, and it is the locus of points for which the sum of the distances from the two foci is constant." As used herein, the term "ellipse" may, dependent upon the context, also be used in a broader sense to not be limited to the mathematical definition set forth above, but to also include second-order or other modified ellipses.

In FIG. 1, the ellipse on the right is oriented as having been rotated clockwise 90 degrees relative to the ellipse on the left. In various examples and calculations described herein, the term "degrees" is used to describe magnitudes of angles between various lines, vectors, and shapes. However, it should be understood that all examples and equations may be alternatively described (and implemented) in terms of radians, rather than degrees, without affecting how disclosed techniques operate.

In this example, the center of each ellipse may remain fixed, which means that a distance CD between the centers of the two ellipses may also remain constant. Five lines are drawn from the center of each ellipse to points along the perimeter of each ellipse to define six arcs of equal arc length between the perimeter points. The points of those lines at the perimeter of the left ellipse are labeled AL, BL, CL, DL, and EL. The points of those lines at the perimeter of the right ellipse are labeled AR, BR, CR, DR, and ER.

When the left ellipse is rotated clockwise, the right ellipse may correspondingly rotate counterclockwise.

However, the ellipses do not maintain constant contact during this mutual rotation. As seen in FIG. 2, for instance, the points AL and AR are slightly separated from each other. If the ellipses are gears directly connected to each other, this may mean the gears lose contact momentarily. If the ellipses are gears indirectly connected to each other via, for instance, a toothed belt, then this offset may represent a moment at which the toothed belt becomes somewhat slack. Similar loss of contact/slackness may occur at other points during mutual rotation, such as when points BL and BR are along the line between the center points, when points CL and CR are along the line between the center points, and so forth.

To maintain contact throughout mutual rotation, gears may be shaped as modified ellipses, sometimes referred to as "second order ellipses." Examples of so-called second order ellipses are described in U.S. Pat. No. 4,387,642 to Bringhurst et al., which is incorporated herein by reference. A modified ellipse may have dimensions such as a minimum radius (e.g., the shortest line from a center of the modified ellipse to its perimeter) and a maximum radius (e.g., the longest line from the center of the modified ellipse to its perimeter) that are selected to maintain contact between gears during mutual rotation. For example, if two directly-connected gears are shaped as modified ellipses, they may maintain constant contact throughout mutual rotation. If two gears (or sprockets, or other similar components) indirectly connected by a linking member such as a toothed belt, chain, or another similar component are shaped as modified ellipses, the slack in the connecting component may be reduced and may remain constant.

Figure 3:
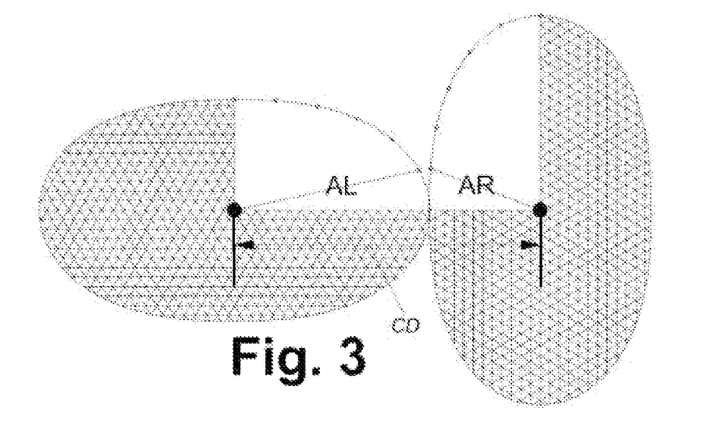
FIGS. 3-5 are graphs depicting an example of how gears with modified elliptical shapes maintain contact when rotated relative to one another.
Figure 4:
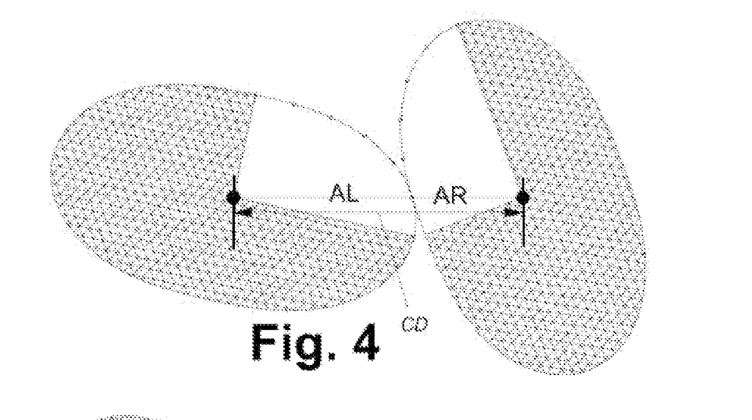
Figure 5:
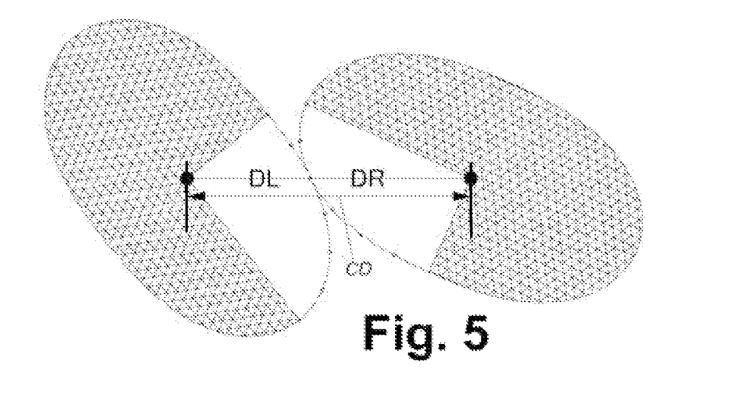

FIGS. 3-5 depict an example of how modified ellipses maintain constant contact during mutual rotation. In FIG. 3, in a manner similar to that shown in FIG. 1, the modified ellipse on the right is rotated 90 degrees clockwise from the modified ellipse on the left. Lines similarly have been drawn from the center points of the ellipses to a perimeter, ending in points AL and AR. In FIG. 4, the left ellipse has been rotated clockwise in an amount so that the line from its center to point AL is along a line between the ellipse centers. Likewise, the right ellipse has been rotated counterclockwise by the same amount so that the line from its center to point AR is along the line between the ellipse centers. It can be seen that constant contact is maintained between the two ellipses. The same holds true in FIG. 5, in which the ellipses have been mutually rotated farther.

Figure 6A:
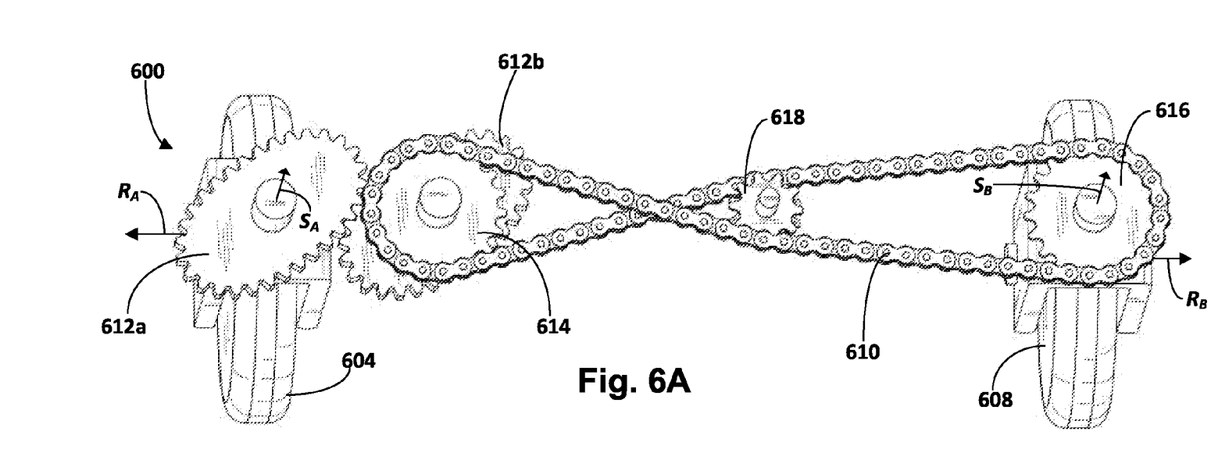
FIGS. 6A-B depict top and bottom views, respectively, of an example embodiment of a steering system in accordance with selected aspects of the present disclosure.
Figure 6B:
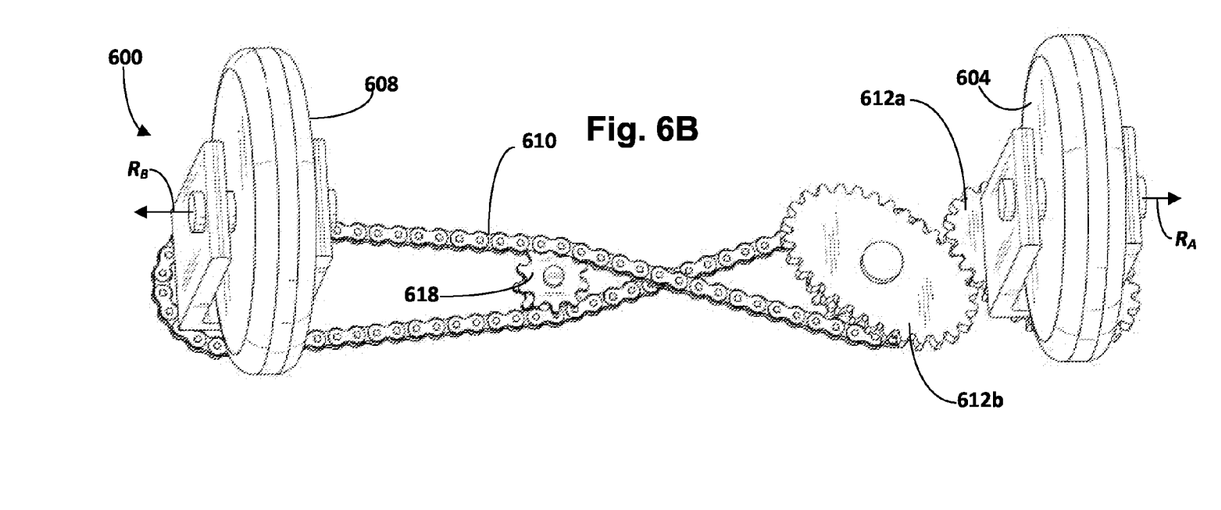

FIGS. 6A and 6B depict an example steering system 600 in which modified elliptical gears are employed, in accordance with various embodiments. In this example, a first wheel 604 may be rotatable about a first steering axis $S_A$ that is perpendicular to an axis of rotation $R_A$ of the first wheel 604. A second wheel 608 may be rotatable about a second steering axis $S_B$ that is perpendicular to an axis of rotation RB of the second wheel 608. A first modified elliptical gear 612a and second modified elliptical gear 612b may control rotation of first wheel 604 about its steering axis, $S_A$, and may be out of phase with one another, e.g., by 90 degrees. In FIGS. 6A-B, first modified elliptical gear 612a and second modified elliptical gear 612b are directly enmeshed or connected, such that clockwise rotation of one causes corresponding counterclockwise rotation of the other. In other embodiments, first modified elliptical gear 612a and second modified elliptical gear 612b may be indirectly connected, e.g., using one or more linking members such as toothed belts or chains. In some embodiments, first and second modified elliptical sprockets may be employed instead of gears, and may be connected using, for instance, a chain. In some embodiments, other mechanical components may be employed in a modified elliptical manner, such as stepper motors that control steering in a fly-by-wire configuration. Firmware to drive the steppers for specific wheel placements may be generated in various ways, including programmatically.

A sprocket 614 to which second modified elliptical gear 612b is connected may also be connected to a chain 610, though this is not required. In other embodiments, sprocket 614 may be directly or indirectly connected to first modified elliptical gear 612a. Rotation of the first modified elliptical gear 612a or second modified elliptical gear 612b may cause rotation of sprocket 614, and vice versa. Rotation of sprocket 614 may move chain 610 in a clockwise or counterclockwise direction (e.g., depending on which direction second modified elliptical gear 612b is rotated). Chain 610 may be connected to another sprocket 616 that is operable to control rotation of second wheel 608 about its second steering axis, $S_B$.

In order for steering system 600 to function properly, first wheel 604 and second wheel 608 should cooperatively rotate about their respective steering axes $S_A$ and $S_B$ in the same direction (although not necessarily by the same angle of rotation, e.g., to maintain Ackerman geometry). In this embodiment, to ensure wheels 604 and 608 rotate about their respective steering axes $S_A$ and $S_B$ in the same direction, first modified elliptical gear 612a and the sprocket 616 associated with second wheel 608 should rotate in the same direction. But sprocket 616 and first modified elliptical gear 612a are not directly connected; second modified elliptical gear 612b and sprocket 614 are positioned between them via chain 610. Accordingly, arranging chain 610 in a figure-eight shape as shown may ensure that sprocket 614 rotates in an opposite direction as sprocket 616. This in turn ensures that sprocket 616 and first modified elliptical gear 612a rotate in the same direction, which means wheels 604 and 608 rotate about their steering axes $S_A$ and $S_B$ in the same direction. In some instances, one or more auxiliary sprockets 618, which may be a pair of primary input sprockets, may be provided to maintain chain 610 in an aligned arrangement with sprockets 614 and 616. In other embodiments, other techniques may be employed to ensure wheels 604 and 608 rotate about their respective steering axes $S_A$ and $S_B$ in the same direction, such as employing multiple sets of modified elliptical gears, etc.

In some embodiments, one or more dimensions of first modified elliptical gear 612a and second modified elliptical gear 612b, such as their minimum and/or maximum radii, may be selected so that first and second steerable wheels (e.g., 604, 608) maintain a predetermined Ackerman geometry when operated to turn a vehicle. FIGS. 11-19 depict various examples of how these dimensions may be determined.

Figure 7:
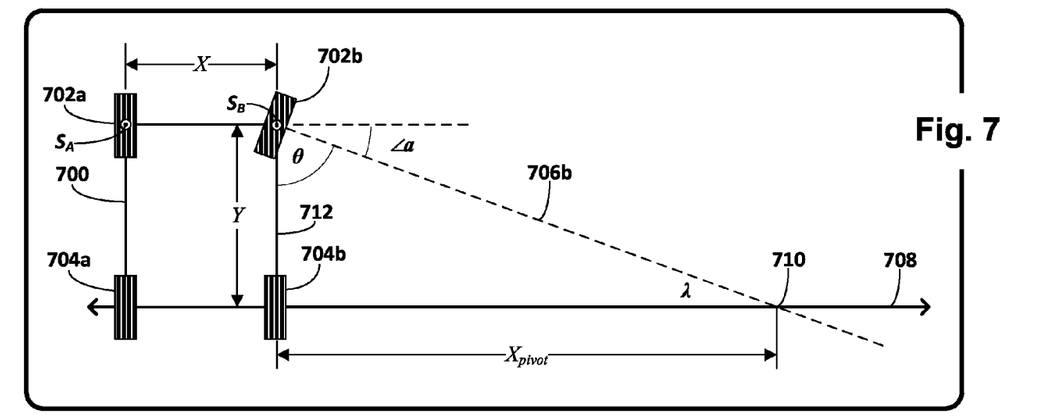
FIGS. 7-8 are schematic diagrams of the geometry of a steered vehicle depicting how example calculations may be performed to maintain a predetermined Ackerman geometry and to determine dimensions of modified elliptical gears, in accordance with various embodiments.
Figure 8:
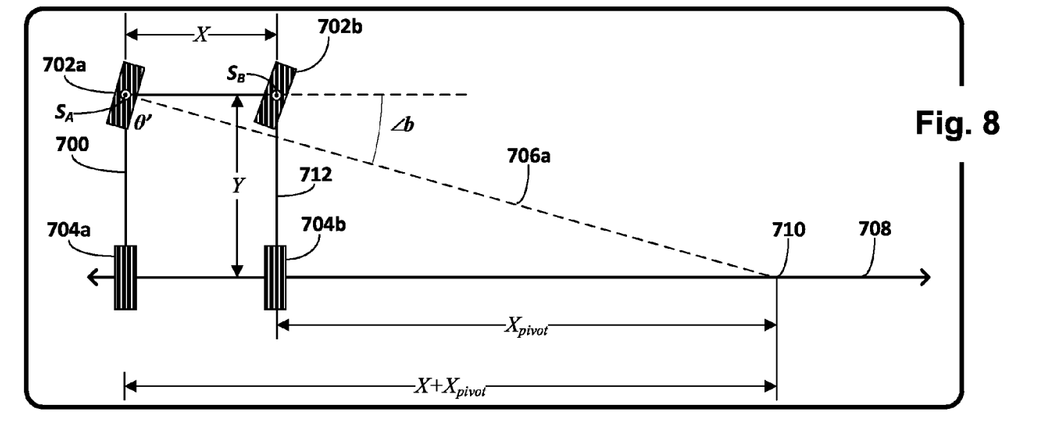

FIGS. 7 and 8 depict an example of how one steerable wheel may be rotated in response to rotation of another steerable wheel in order to maintain a predetermined Ackerman geometry. A vehicle 700 (schematically represented in FIGS. 7-8), as well as other vehicles mentioned herein, may be various types of vehicles, such as a go-cart, a golf cart, a riding lawn mower, a forklift, a utility vehicle, an all-terrain vehicle, an automobile, and so forth. In some embodiments, vehicle 700 may be a so-called "zero radius" turning vehicle, which means it may effectively spin around an axis in its center, or around an axis at the center of a rear axle, without translational movement of the vehicle across the surface on which the wheels are in rolling contact.

Vehicle 700 includes first and second steerable wheels 702a and 702b, and first and second non-steered wheels 704a and 704b. First steerable wheel 702a may be steerable about its steering axis $S_A$ (extends out from the page). Second steerable wheel 702b likewise may be steerable about its steering axis $S_B$ (extends out from the page). First and second non-steered wheels 704a and 704b may not be capable of being steered, and may share an axis of rotation that may be collinear with their respective axles, and of which an extension thereof is indicated at 708.

In FIG. 7, second steerable wheel 702b has been steered about its steering axis by an angle, ∠a. An axis of rotation of second steerable wheel 702b, when extended as indicated at 706b, intersects an extension of shared axis of rotation 708 of non-steered wheels 704a and 704b at a point of intersection 710, forming an angle λ between the extension of axis of rotation 706b and the extension of shared axis of rotation 708. Another angle, θ, is formed between a line 712 (representing a distance Y between the axis of rotation of the second steerable wheel 702b and the axis of rotation of the non-steered wheel 704b) and the extension of the axis of rotation 706a of second steerable wheel 702b. Points of a right triangle are defined, therefore, by the steering axis $S_B$ of the second steerable wheel 702b, the axis of rotation of the second non-steered wheel 704b, and the point of intersection 710. Using basic geometry and trigonometry, the angle θ and the bottom side $X_{pivot}$ of the right triangle can be calculated using equations such as the following:

$$\theta = 90 - \angle a \qquad (1)$$

$$X_{pivot} = Y \times \tan(\theta) \qquad (2)$$

Once $X_{pivot}$ is known, the point of intersection 710 may also be determined.

As described above, in order to maintain a particular Ackerman geometry, an axis of rotation of first steerable wheel 702a, when extended as indicated at 706a in FIG. 8, must intersect shared axis 708 at the point of intersection 710 (i.e. at the same point that the axis of rotation of second steerable wheel 702b intersects axis 708). Thus, in FIG. 8, first steerable wheel 702a has been rotated about its steering axis $S_A$ by an angle, ∠b, so that axis of rotation 706a intersects axis 708 at point of intersection 710. Points of a right triangle are again defined, this time by first steerable wheel 702a, first non-steered wheel 704a, and point of intersection 710. To determine a value of angle of rotation ∠b, again basic geometry and trigonometry may be applied:

$$\theta' = \tan^{-1} \frac{X + X_{pivot}}{Y} \qquad (3)$$

$$\angle b = 90 - \theta' \qquad (4)$$

To maintain the predetermined Ackerman geometry when second steerable wheel 702b is rotated by ∠a, first steerable wheel 702a may be rotated by ∠b. Because ∠b is on the outside of the turn shown in the figures, it may be slightly less than ∠a, as expected.

For example, suppose Y is equal to 10 (e.g., feet, meters, etc.), X is equal to 5, and ∠a is equal to 20 degrees. Equations (1) and (2) may be used to determine that θ=70 degrees and $X_{pivot}$=27.47477 (10×tan(70°)). Equations (3) and (4) may then be used to determine that θ'=72.89 degrees, which means ∠b=17.11 degrees, which, as expected, is slightly less than ∠a.

Of course, the particular equations used in this example and described as being used in other examples herein are not meant to be limiting. For example, another right triangle could also be defined in FIG. 7 by second steerable wheel 702b, point of intersection 710, and a third point (not depicted) that is a distance Y above point of intersection 710. Alternative trigonometric equations may be used with these known sides/angles of this alternative right triangle to solve for $X_{pivot}$. The same is true for other examples described herein.

In FIGS. 7 and 8, steerable wheels 702a and 702b, when pointed straight ahead, have axes of rotation that are collinear. They also are depicted to be laterally aligned (that is, a line drawn perpendicular to 708 through the centroid of non-steered wheel 704a will intersect the steering axis $S_A$ of wheel 702a, and likewise a line drawn perpendicular to 708 through the centroid of non-steered wheel 704b will intersect the steering axis $S_B$ of wheel 702b). However, this is not required, and in other embodiments, steerable wheels 702a and 702b may be out of alignment, both with each other and vis-à-vis non-steered wheels 704a and 704b. For example, in some embodiments, one of the steerable wheels 702a and 702b may be farther from the non-steered wheels 704a and 704b than the other of the steerable wheels.

Figure 9:
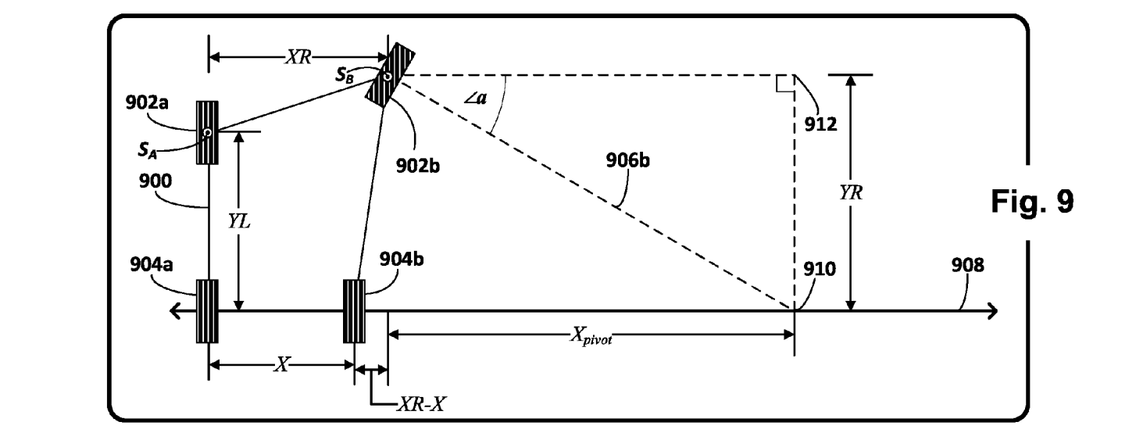
FIGS. 9-10 are schematic diagrams of the geometry of another steered vehicle depicting how more example calculations may be performed to determine dimensions of modified elliptical gears, in accordance with various embodiments.
Figure 10:
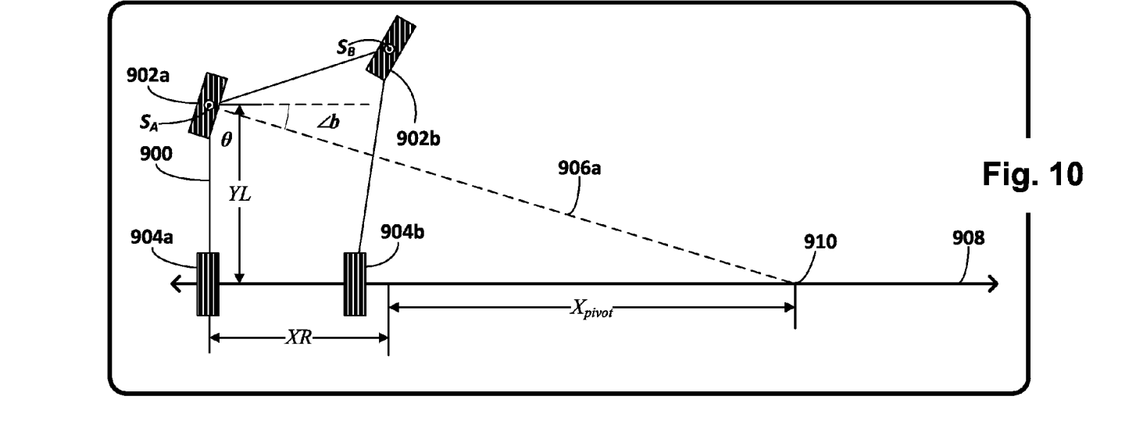

FIGS. 9 and 10 depict an example of how a first steerable wheel 902a, which is located closer to axis of rotation 908 of a vehicle 900 than is a second steerable wheel 902b, may be rotated in response to rotation of second steerable wheel 902b in order to maintain a predetermined Ackerman geometry. Second steerable wheel 902b is laterally offset from second non-steered wheel 904b by a distance XR-X, while first steerable wheel 902a is laterally aligned with first non-steered wheel 904a.

Second steerable wheel 902b has been steered about its steering axis $S_B$ by an angle, ∠a. As was the case above, in order to maintain Ackerman geometry, first steerable wheel 902a must also be steered about its steering axis $S_A$ by an angle, ∠b, such that an extension 906a (see FIG. 10) of an axis of rotation of first steerable wheel 902a intersects an extension 908 of an axis of rotation shared by non-steered wheels 904a and 904b at the same point of intersection 910 as an extension 906b (see FIG. 9) of an axis of rotation of second steerable wheel 902b. Once again, the angle ∠b can be determined using trigonometry.

For example, points of a right triangle are again defined, this time by second steerable wheel 902b, point of intersection 910, and a third point 912 that is a perpendicular distance YR from extension 908 of the axis of rotation shared by non-steered wheels 904a and 904b. If angle ∠a and the length YR of the opposite side are known, the distance $X_{pivot}$ along the x axis between second steerable wheel 902b and point of intersection 910, may be determined using an equation such as the following:

$$X_{pivot} = \frac{YR}{\tan(\angle a)} \qquad (5)$$

Once $X_{pivot}$ is known, it is possible to solve for ∠b. Referring to FIG. 10, first steerable wheel 902a has been rotated by ∠b so that an extension 906a of its axis of rotation intersects extension 908 of the axis shared by non-steered wheels 904a and 904b at the point of intersection 910. Points of a right triangle are defined by first steerable wheel 902a, first non-steered wheel 904a, and point of intersection 910. Trigonometric equations such as the following may be used to solve for ∠b:

$$\angle b = 90° - \tan^{-1}\frac{X_{pivot} + XR}{YL} \quad (6)$$

For example, suppose YR is equal to 12 (e.g., feet, meters, etc.), XR is equal to 7, YL is equal to 10, and ∠a is equal to 30 degrees. Equation (5) may be used to determine that $X_{pivot}$=20.785. Equation (6) may then be used to determine that ∠b=19.79 degrees, which is less than ∠a, as expected.

Figure 11:
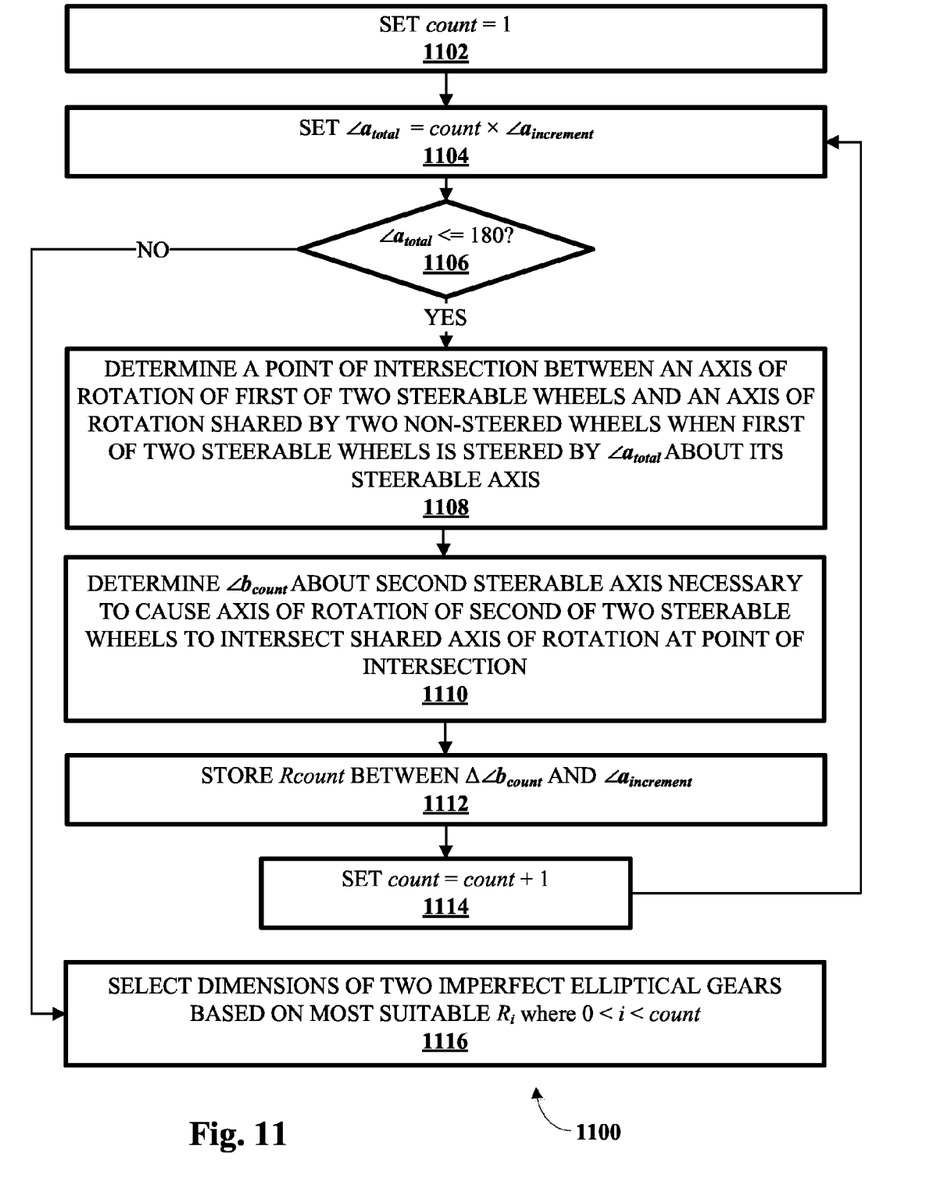
FIG. 11 is a flow chart depicting an example method of calculating dimensions of modified elliptical gears, in accordance with various embodiments.

FIG. 11 depicts an example method 1100 that may be implemented in some embodiments to determine dimensions of two modified elliptical gears (or sprockets, or other similar components) based on pursuit of Ackerman geometry, in accordance with various embodiments. In this example, a first steerable wheel of a vehicle is steered about its steering axis (e.g., hypothetically) by an incremental angle a plurality of iterations, each iteration requiring corresponding steering of a second steerable wheel about its steering axis to maintain Ackerman geometry. A relationship between a change in the corresponding angle steered by the second wheel (from an immediately previous angle steered by the second wheel) and the incremental angle steered by the first steerable wheel may be used to define dimensions of the modified elliptical gears, such as 612a and 612b in FIG. 6.

At block 1102, a variable, count, may be set to one. This variable may represent a count of incremental rotations performed by a steerable wheel, such as second steerable wheel 702b in FIGS. 7 and 8 or second steerable wheel 902b in FIGS. 9 and 10, about its steering axis (components of vehicle 700 in FIGS. 7-8 will be referenced for the remainder of this explanation of method 1100). At block 1104, a total rotation of second steerable wheel 702b about its steering axis, $\angle a_{total}$, may be determined by multiplying count by an incremental angle of rotation, $\angle a_{increment}$, applied at each iteration of count.

At block 1106, it may be determined whether $\angle a_{total}$ has surpassed a threshold angle, e.g., 180 degrees (or π radians). If $\angle a_{total}$ has not surpassed the threshold, method 1100 may proceed to block 1108. At block 1108, a point of intersection between an axis of rotation of second steerable wheel 702b and an axis of rotation shared by two non-steered wheels (e.g., 704a and 704b) may be determined when second steerable wheel 702b is rotated about its steering axis by $\angle a_{total}$. For example, equations such as (1) and (2) may be employed.

At block 1110, an angle $\angle b_{count}$ that must be steered by first steerable wheel 702a to cause its axis of rotation to intersect the axis of rotation shared by two non-steered wheels at the point of intersection determined at block 1108 may be determined. In some embodiments, an equation similar to equation (6) may be used to solve for $\angle b_{count}$.

At block 1112, a relationship, $R_{count}$, between $\Delta\angle b_{count}$ (i.e., $\angle b_{count} - \angle b_{count-1}$) and $\angle a_{increment}$ may be determined and stored, e.g., in a data construct such as an array or linked list if a computer is being used. For example, in some embodiments, $R_{count}$ may be a ratio between $\Delta\angle b_{count}$ and $\angle a_{increment}$. At block 1114, count may be incremented by one, and then method 1100 may proceed back to block 1104.

Blocks 1104-1114 may repeat until it is determined at block 1106 that $\angle a_{total}$ has surpassed a predetermined threshold angle, such as 180 degrees. When that happens, method 1100 may proceed to block 1116. At block 1116, dimensions of two modified elliptical gears to employ in a steering system of the vehicle under analysis may be selected based on a relationship $R_i$ of the plurality of relationships $R_1$ to $R_{count-1}$ that was most suitable. For example, in some embodiments, the maximum ratio, $ratio_{max}$, between $\Delta\angle b_i$ and $\angle a_{increment}$ where 0<i<count may be selected as a ratio between a maximum radius, $radius_{max}$, and a minimum radius, $radius_{min}$, of modified elliptical gears.

Suppose it is desired to have a center distance, CD, between centers of mating identical modified elliptical gears. In such case, the following two equations may be solved for the two unknowns, $radius_{max}$ and $radius_{min}$:

$$radius_{max}/radius_{min} = ratio_{max} \quad (7)$$

$$radius_{max} + radius_{min} = CD \quad (8)$$

In some embodiments, an equation such as the following, which was stated in "Mechanisms, Linkages and Mechanical Controls," by Nicholas Paul Chironis, published by McGraw-Hill, 1965, may be used to calculate the radius of a modified elliptical gear at any angle θ once $radius_{max}$ and $radius_{min}$ (which are related to each other by the ratio $ratio_{max}$) are known:

$$radius_\theta = \frac{2 radius_{max} radius_{min}}{(radius_{max} + radius_{min}) - (radius_{max} - radius_{min})\cos(2\theta)} \quad (9)$$

Figure 12:
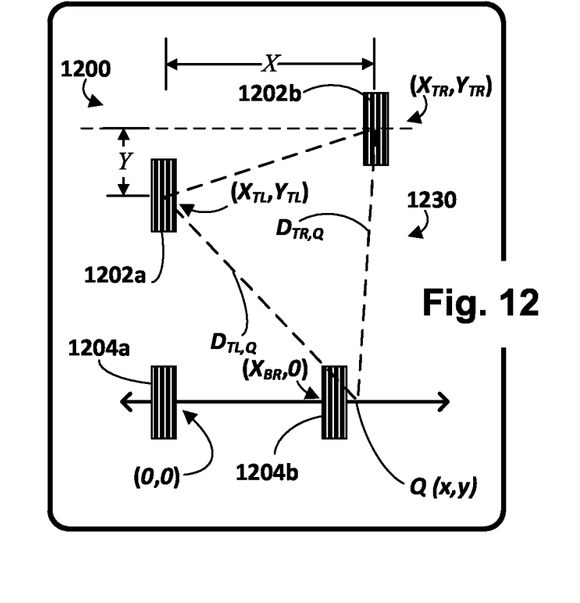
FIGS. 12-16 are schematic diagrams of the geometry of another steered vehicle demonstrating how more example calculations may be performed to determine dimensions of modified elliptical gears, in accordance with various embodiments.

FIGS. 12-15 depict another, perhaps more efficient, example of how dimensions of a modified elliptical gear may be determined based on wheel placement of a vehicle. In FIG. 12, four wheels 1202a-b and 1204a-b of a vehicle 1200 are positioned similarly to the wheels of vehicle 900 in FIG. 9. However, it should be understood that this represents only one potential placement of wheels, and that other arrangements (which may be more common) may include the front wheels being aligned with each other and/or with respective rear wheels. In FIG. 12, an isosceles triangle 1230 has been drawn in dashed lines, with a line between steerable wheels 1202a and 1202b as a base and two equal-length lines extending from steerable wheels 1202a and 1202b to a common point of intersection Q on a horizontal axis that passes through the shared axis of rotation of non-steered wheels 1204a and 1204b.

In some embodiments, computer-aided design, or "CAD", software may be used to draw isosceles triangle 1230. The CAD software may then automatically calculate and provide lengths of the sides of isosceles triangle 1230, as well as angles between those sides. In other embodiments, however, isosceles triangle 1230 may be automatically calculated using known dimensions of the vehicle 1200. For example, suppose the wheels are placed on an x/y plane, with bottom left wheel 1204a positioned at the origin, or point (0,0). Top left wheel 1202a may be at point ($X_{TL}$, $Y_{TL}$). Top right wheel 1202a may be at point ($X_{TR}$, $Y_{TR}$). Bottom right wheel 1204b may be at point ($X_{BR}$, $Y_{BR}$). Suppose common point of intersection Q lies at (x,y). The distance from first steerable wheel 1202a to common point of intersection Q can be calculated using the distance formula:

$$D_{TL,Q} = \sqrt{(x - X_{TL})^2 + (y - Y_{TL})^2} \quad (10)$$

Likewise, the distance from second steerable wheel 1202b to common point of intersection Q can be calculated using the following formula:

$$D_{TR,Q} = \sqrt{(x - X_{TR})^2 + (y - Y_{TR})^2} \quad (11)$$

Because triangle 1230 is isosceles, $D_{TL,Q}=D_{TR,Q}$. Accordingly, the following is true:

$$\sqrt{(x - X_{TL})^2 + (y - Y_{TL})^2} = \sqrt{(x - X_{TR})^2 + (y - Y_{TR})^2}.$$

Eliminating the square roots and multiplying the equations out yields the following:

$$x^2 - 2X_{TL}x + X_{TL}^2 + y^2 - 2Y_{TL}y + Y_{TL}^2 = x^2 - 2X_{TR}x + X_{TR}^2 + y^2 - 2Y_{TR}y + Y_{TR}^2$$

Subtracting $x^2$ and $y^2$ from both sides yields the following:

$$-2X_{TL}x + X_{TL}^2 - 2Y_{TL}y + Y_{TL}^2 = -2X_{TR}x + X_{TR}^2 - 2Y_{TR}y + Y_{TR}^2$$

The point Q lies on the x axis, at point (x,0), and so y can be set to zero to yield the following:

$$-2X_{TL}x + X_{TL}^2 + Y_{TL}^2 = -2X_{TR}x + X_{TR}^2 + Y_{TR}^2$$

Using algebra to solve for x, the following equation yields the x coordinate of the common point Q of intersection:

$$x = \frac{X_{TR}^2 + Y_{TR}^2 - Y_{TL}^2}{2X_{TR}} \quad (12)$$

Because the locations of the wheels on the x/y plane will be known from the dimensions of the vehicle, x can be calculated using equation (12).

It should be noted that an isosceles triangle may be drawn in a similar fashion no matter where steerable wheels 1202a and 1202b are placed relative to non-steered wheels 1204a and 1204b. For example, suppose steerable wheels 1202a and 1202b were positioned on a common horizontal axis, rather than steerable wheel 1202b being offset. Suppose further that steerable wheels 1202a and 1202b were aligned with non-steered wheels 1204a and 1204b, respectively. Isosceles triangle 1230 would have its two equal-length sides meet at a point of intersection Q that is halfway between non-steered wheels 1204a and 1204b. The operations described herein will function the same regardless.

Figure 13:
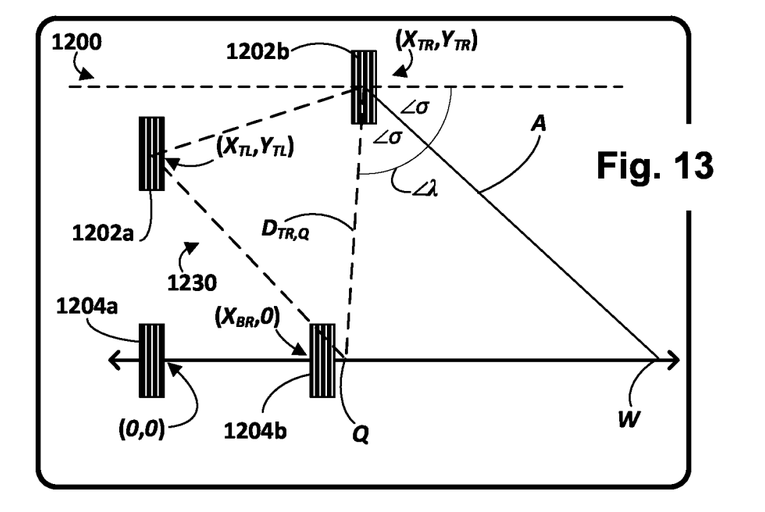

In FIG. 13, a line, A, has been drawn that bisects an angle between a right side of isosceles triangle 1230 and an axis of rotation of second steerable wheel 1202b. Line A intersects the horizontal axis through non-steered wheels 1204a and 1204b at another point of intersection W. An angle $\angle\lambda$ may be calculated, for instance, by calculating a dot product of a unit vector representing the line $D_{TR,Q}$ and another unit vector extending in a positive x direction (to the right in FIG. 13) from second steerable wheel 1202b along its axis of rotation. The dot product of these unit vectors may be equal to $\cos(\angle\lambda)$. The angle $\angle\sigma$ between line A and the line $D_{TR,Q}$, as well as the equal angle $\angle\sigma$ between line A and the axis of rotation of second steerable wheel 1202b, is $\angle\sigma=\angle\lambda/\lambda$. Once $\angle\sigma$ is known, the x coordinate of point of intersection W, $W_x$, can be calculated using an equation such as the following:

$$W_x = \frac{Y_{TR}}{\tan(\sigma)} + X_{TR} \quad (13)$$

In addition, the length $A_L$ of line A may also be calculated using an equation such as the following:

$$A_L = \frac{Y_{TR}}{\cos(\sigma)} \quad (14)$$

Figure 14:
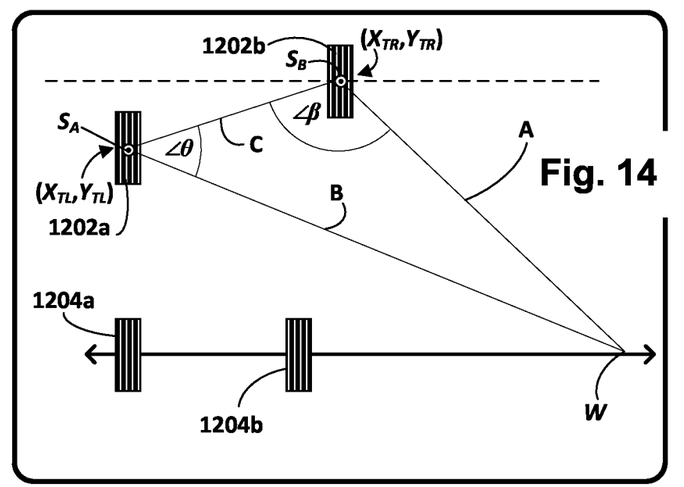

In FIG. 14, two more lines, B and C, have been drawn to form a scalene triangle ABC with one vertex at common point of intersection W and the other two vertices at steering axes $S_A$, $S_B$ of front wheels 1202a and 1202b. As shown above, the length of A ($A_L$) can be determined using equation (14). The length of B ($B_L$) may be determined using an equation such as the following distance formula:

$$B_L = \sqrt{(W_x - X_{TL})^2 + Y_{TL}^2} \quad (15)$$

The length of C ($C_L$) may be determined using an equation such as the following distance formula:

$$C_L = \sqrt{(X_{TL} - X_{TR})^2 + (Y_{TL} - Y_{TR})^2} \quad (16)$$

Two angles, $\angle\beta$ and $\angle\theta$, are shown between lines A and C, and B and C, respectively. In some embodiments, angles $\angle\beta$ and $\angle\theta$ may be calculated using the Law of Cosines. For example, the following equations may be used:

$$\theta = \cos^{-1}\left(\frac{A^2 - B^2 - C^2}{-2BC}\right) \quad (17)$$

$$\beta = \cos^{-1}\left(\frac{B^2 - A^2 - C^2}{-2AC}\right) \quad (18)$$

Figure 15:
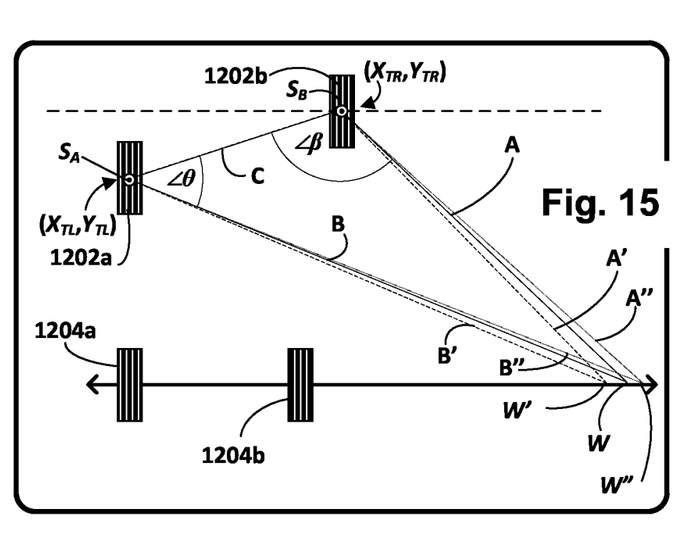

FIG. 15 depicts how, using scalene triangle ABC, it is possible (with fewer calculations than were used in method 1100) to compute a ratio of maximum to minimum radius of modified elliptical gears that when employed will maintain a predetermined Ackerman geometry. Take the common point of intersection W and move it some small distance to the left to create a new point of intersection, W'. Calculate scalene triangle ABC' that intersects this new point of intersection W', including calculating $\angle\beta'$ and $\angle\theta'$. Then, take the original common point of intersection W and move it some small distance to the right to create another point of intersection, W". Calculate scalene triangle ABC" to intersect this new point of intersection W", including calculating $\angle\beta"$ and $\angle\theta"$. The ratio, $\text{ratio}_{max}$, of the maximum radius of a modified elliptical gear, $\text{radius}_{max}$, to a minimum radius of the modified elliptical gear, $\text{radius}_{min}$, may be calculated using an equation such as the following:

$$\text{ratio}_{max} = \frac{\Delta\beta}{\Delta\theta} = \frac{\angle\beta" - \angle\beta'}{\angle\theta" - \angle\theta'} \quad (19)$$

Once $\text{ratio}_{max}$ and a desired distance, CD, between centers of identical, modified elliptical gears are known, then equations such as equations (7)-(9) above may be used to determine the radius of the modified elliptical gears at any angle θ.

Figure 16:
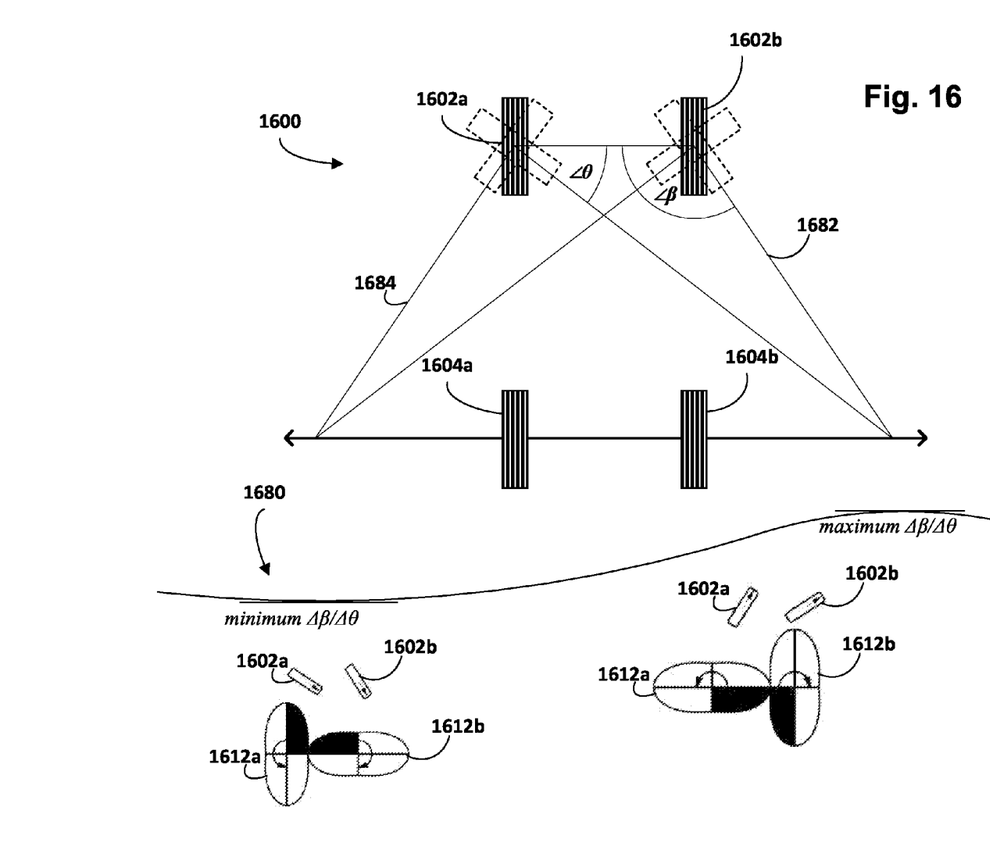

FIG. 16 demonstrates how a ratio between Δβ and Δθ may change as steerable wheels 1602a and 1602b of a vehicle 1600 are steered as indicated by the dashed lines. A curve 1680 depicted at bottom demonstrates how the ratio between Δβ and Δθ changes as steerable wheels 1602a and 1602b are rotated about various angles. The maximum ratio between Δβ and Δθ is seen on the right, when first steerable wheel 1602a and second steerable wheel 1602b are steered so that first scalene triangle 1682 is formed, similar to scalene triangle ABC of FIG. 14. The minimum ratio between Δβ and Δθ is seen on the left, when first steerable wheel 1602a and second steerable wheel 1602b are rotated so that second scalene triangle 1684 is formed. Either ratio may be used to determine a ratio of a maximum radius of a modified elliptical gear (e.g., 612a and 612b in FIGS. 6A-B) to a minimum radius of the same gear. Once those quantities are known, equations such as (7)-(9) above may be employed to determine other dimensions of the gears.

Also visible in FIG. 16 are schematic depictions of first and second modified elliptical gears, 1612a and 1612b, as they may be oriented in relation to first and second steerable wheels 1602a and 1602b, respectively. At bottom right, wheels 1602a and 1602b are rotated relative to one another to maintain a predetermined (e.g., ideal) Ackerman geometry. In particular, wheels 1602a and 1602b are rotated so that their respective axes of rotations intersect one another at a point along an axis (not depicted in FIG. 16) shared by rear wheels (also not depicted) that is determined in a manner similar to common point of intersection W in FIG. 14 (e.g., by calculating isosceles, then scalene, triangles).

In some embodiments, gears 1612a and 1612b may be connected to wheels 1602a and 1602b as follows. After gears 1612a and 1612b are rotated as shown at bottom right, with one (1612a in this example) oriented horizontally and the other (1612b in this example) oriented vertically, one of the gears (e.g., 1612b) may be "unwound" by −∠σ (see equation (13) and related discussion above), which also will rotate the other enmeshed gear. Then, wheels 1602a and 1602b may be pointed "straight forward" (i.e. zero angle of rotation about their steering axes), after which gears 1612a and 1612b may then be connected to wheels 1602a and 1602b. In some embodiments, one or more modified elliptical gears described herein, such as 1612a and 1612b, may have a number of teeth that is twice an odd number, so that the gears may be properly enmeshed.

Figure 17:
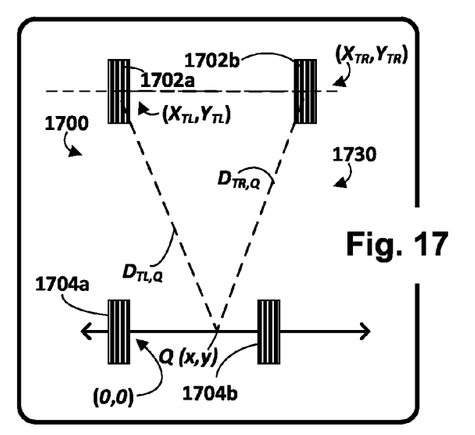
FIGS. 17-19 are schematic diagrams of the geometry of another steered vehicle demonstrating a simplified variation of the methodology employed in FIGS. 12-16, in accordance with various embodiments.
Figure 18:
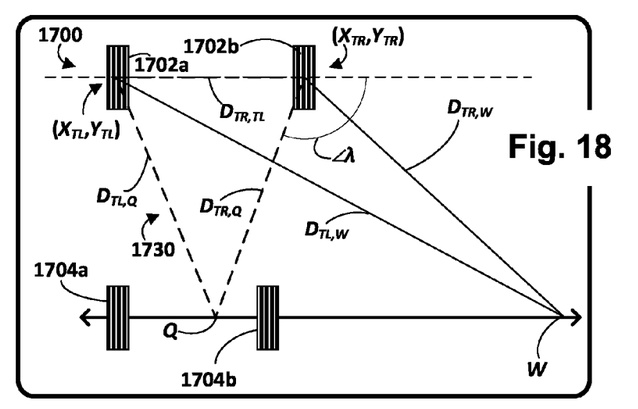
Figure 19:
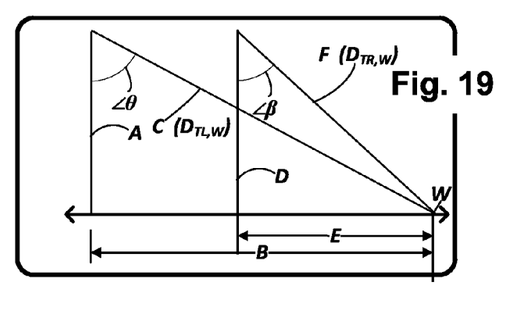

FIGS. 17-19 demonstrate a simplified variation of the methodology employed in FIGS. 12-15 that may be applicable when steerable wheels 1702a, 1702b of a vehicle 1700 are not offset fore and aft from an axis shared by non-steered wheels 1704a, 1704b of the vehicle 1700 (e.g., when collinear front axles are parallel to the rear axle). Steerable wheels 1702a, 1702b can still be, but need not be, offset laterally. In FIG. 17, an isosceles triangle 1730 has been drawn in dashed lines, with a line $D_{TL,TR}$ between steerable wheels 1702a and 1702b as a base and two equal-length lines $D_{TL,Q}$, $D_{TR,Q}$ extending from steerable wheels 1702a and 1702b to a common point of intersection Q on a horizontal axis that passes through non-steered wheels 1704a and 1704b.

By assigning x/y coordinates to various components (e.g., by placing first non-steered wheel 1704a at origin 0,0) and using various equations such as equation (12) above, an x component of Q may be determined. The angle ∠λ between line $D_{TR,Q}$ and an extension of $D_{TR,TL}$ to the right of second steerable wheel 1702b may once again be determined by taking the dot product of corresponding unit vectors. Once ∠λ is known, a line $D_{TR,W}$ that bisects ∠λ can be determined. As shown in FIG. 18, a scalene triangle may be defined by the lines $D_{TR,W}$, $D_{TL,W}$, and $D_{TR,TL}$. The lines $D_{TR,W}$ and $D_{TL,W}$, along with lines A and D dropped from steerable wheels 1702a and 1702b, respectively, to an axis shared by non-steered wheels 1704a and 1704b, yields the two right triangles depicted in FIG. 19, ABC and DEF.

The following equations, which may employ the derivative of the arctangent function, may be used to calculate the derivatives in FIG. 19 without the construction and slight alteration of various scalene triangles depicted in FIG. 15:

$$\Delta\theta = \frac{1}{1+\left(\frac{B}{A}\right)^2} \quad (20)$$

$$\Delta\beta = \frac{1}{1+\left(\frac{E}{D}\right)^2} \quad (21)$$

The ratio, $\text{ratio}_{max}$, of the maximum radius of a modified elliptical gear, $\text{radius}_{max}$, to a minimum radius of the modified elliptical gear, $\text{radius}_{min}$, may be calculated using an equation such as the following:

$$\text{ratio}_{max} = \frac{\Delta\beta}{\Delta\theta} \quad (22)$$

Once $\text{ratio}_{max}$ and a desired distance, CD, between centers of identical, modified elliptical gears are known, then equations such as equations (7)-(9) above may be used to determine the radius of the modified elliptical gears at any angle θ.

Figure 20:
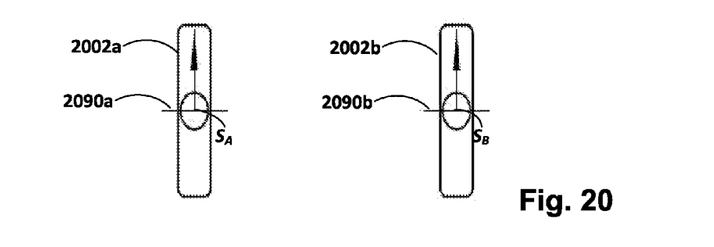
FIGS. 20-22 depict example steerable wheel configurations, in accordance with various embodiments.

While embodiments depicted in previous figures typically have included steering axes that are aligned with centers of wheels, this is not required. FIGS. 20-22 depict variations of wheels and respective steering axes about which those wheels may turn. Regardless of where the steering axes are located relative to the respective wheels, the Ackerman computations described throughout this disclosure are applicable. In FIG. 20, centers of wheels 2002a and 2002b, and more particularly, centers of axles 2090a and 2090b associated with those wheels, are aligned with centers of respective steering axes $S_A$ and $S_B$, as generally shown in previous figures.

Figure 21A:
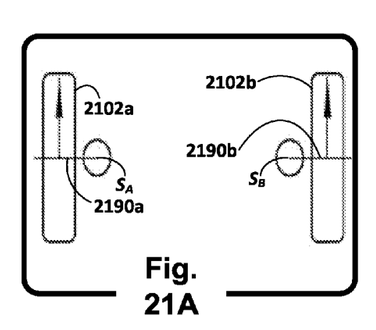
Figure 21B:
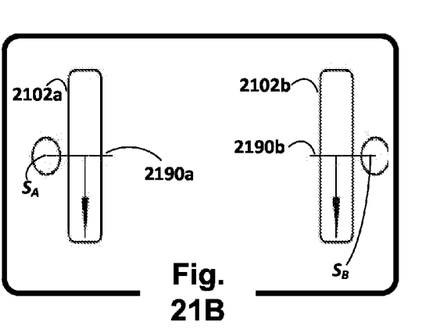
Figure 22:
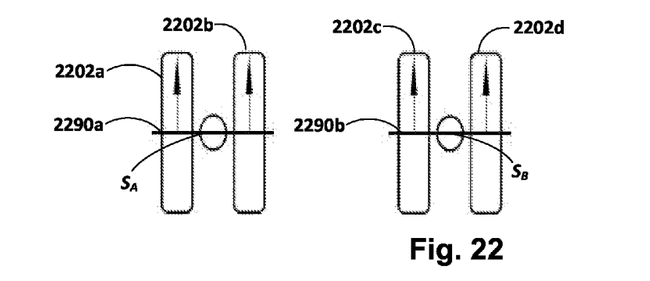

However, as depicted in FIGS. 21-22, steering axes may be located elsewhere in relation to respective wheels. For example, in FIG. 21A, wheels 2102a and 2102b are located along axles 2190a and 2190b outboard of their respective steering axes $S_A$ and $S_B$. When wheels 2102a and 2102b are rotated by 180 degrees, they may be then located inboard of their respective steering axes $S_A$ and $S_B$, as depicted in FIG. 21B. FIG. 22 depicts another variation in which four wheels 2202a-d are employed. Two wheels, 2202a and 2202b, flank a first steering axis $S_A$ on a first axle 2290a. Two other wheels, 2202c and 2202d, flank a second steering axis $S_B$ on a second axle 2290a. Unlike FIGS. 21A and 21B, the wheel configuration depicted in FIG. 22 may maintain symmetry throughout wheel rotation.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A steering system, comprising:
    a first wheel that is rotatable about a first steering axis perpendicular to an axis of rotation of said first wheel;
    a second wheel that is rotatable about a second steering axis perpendicular to an axis of rotation of said second wheel;
    a first modified elliptical gear having its center collinear with said first steering axis;
    a second modified elliptical gear connected to said first modified elliptical gear, wherein said first and second modified elliptical gears are operable to rotate said first wheel about said first steering axis wherein a ratio of a minimum radius to a maximum radius of at least one of said first and second gears is substantially equal to a ratio of an incremental angle of rotation of said first wheel about said first steering axis to an angle of rotation of said second wheel about said second steering axis that is applied based on the incremental angle of rotation of said first wheel to maintain a predetermined Ackerman geometry;
    a sprocket operable to turn said second wheel about said second steering axis; and
    one or more linking members operably coupling rotational movement of said second gear to rotation of said sprocket.

2. The steering system of claim 1, wherein said one or more linking members further comprises a chain crossed over itself in between said first gear and said sprocket to form a figure eight.

3. The steering system of claim 1, wherein said first and second gears have second order elliptical shapes.

4. The steering system of claim 1, wherein said angle of rotation of said second wheel about said second steering axis comprises a maximum of a plurality of angles of rotation of said second wheel about said second steering axis that are applied based on a plurality of corresponding incremental angles of rotation of said first wheel about said first steering axis to maintain said predetermined Ackerman geometry.

5. The steering system of claim 1, wherein a minimum radius to maximum radius ratio of at least one of said first and second gears is substantially equal to a ratio of an angle of rotation of said first wheel about said first steering axis to an angle of rotation of said second wheel about said second steering axis that is applied based on the angle of rotation of said first wheel to maintain a predetermined Ackerman geometry.

6. The steering system of claim 1, wherein said first and second gears are directly enmeshed.

7. The steering system of claim 1, further comprising at least a non-steered third wheel, wherein one of said first and second wheels is farther from said non-steered third wheel than the other of said first and second wheels.

8. The steering system of claim 7, further comprising a non-steered fourth wheel that shares an axis of rotation with said non-steered third wheel, wherein one of said first and second wheels is farther from said shared axis of rotation than the other of said first and second wheels.

9. The steering system of claim 1, wherein said first and second gears have the same shape and size.

10. A steering system, comprising:
    a first wheel that is rotatable about a first steering axis perpendicular to an axis of rotation of said first wheel;
    a second wheel that is rotatable about a second steering axis perpendicular to an axis of rotation of said second wheel;
    first and second gears, each having second order elliptical shapes, at least indirectly connected, that are operable to rotate said first wheel about said first steering axis;
    a first sprocket connected to and driven by rotation of at least one of said first and second gears;
    a second sprocket connected to said first sprocket via a chain or belt, said second sprocket being operable to turn said second wheel about said second steering axis; and
    wherein a ratio of a minimum radius to a maximum radius of at least one of said first and second gears is substantially equal to a ratio of an incremental angle of rotation of said first wheel about said first steering axis to an angle of rotation of said second wheel about said second steering axis that is required, based on said incremental angle of rotation of said first wheel, to maintain a predetermined Ackerman geometry.

* * * * *